June 25, 1946.                C. M. SUMMERS                2,402,928
SYNCHRONOUS MOTION TRANSMISSION SYSTEM
            Filed March 10, 1944         4 Sheets-Sheet 1

Inventor:
Claude M. Summers,
by  Harry E. Dunham
His Attorney.

June 25, 1946.
C. M. SUMMERS
2,402,928
SYNCHRONOUS MOTION TRANSMISSION SYSTEM
Filed March 10, 1944
4 Sheets-Sheet 2
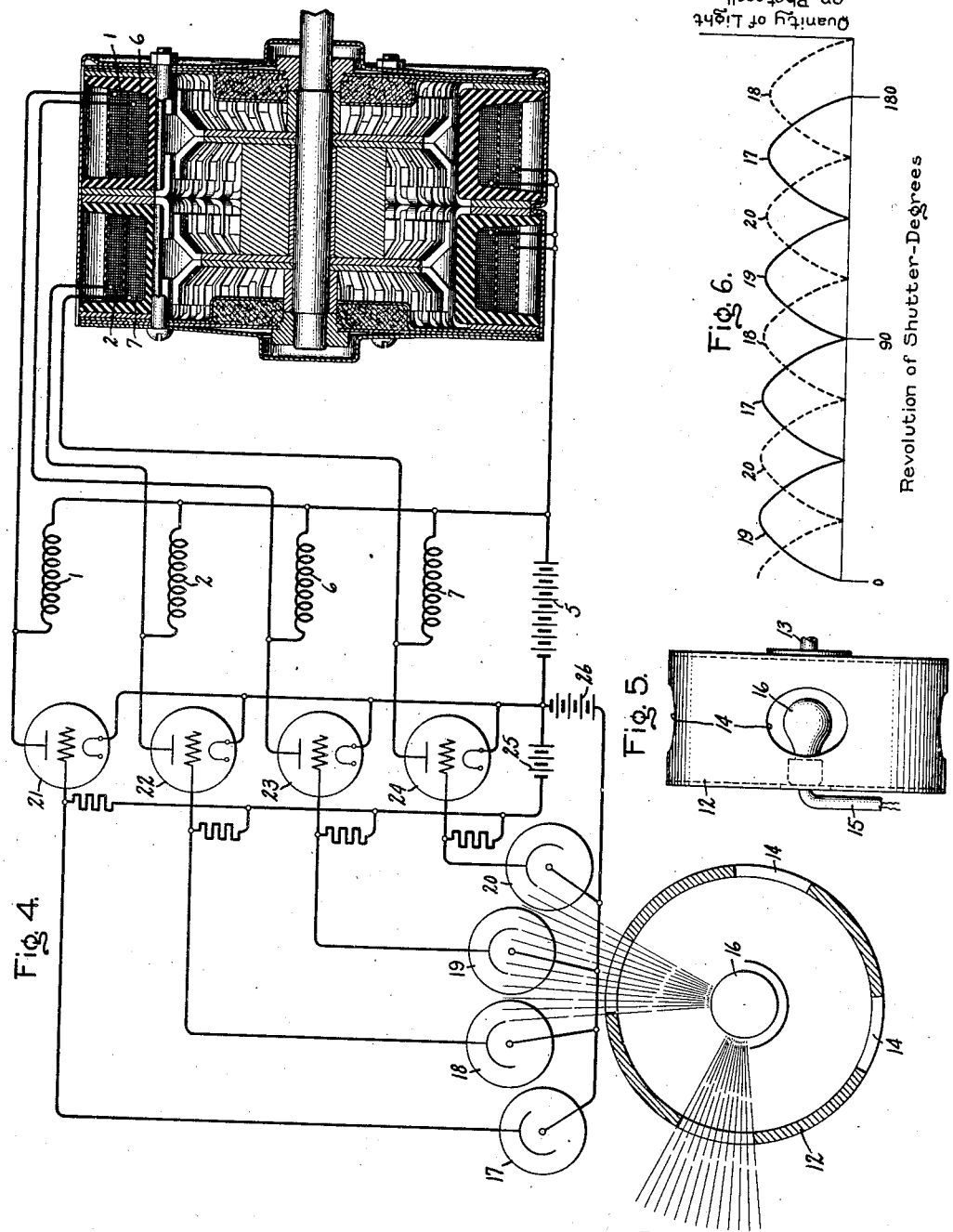
Inventor:
Claude M. Summers,
by Harry E. Dunham
His Attorney.

June 25, 1946.   C. M. SUMMERS   2,402,928
SYNCHRONOUS MOTION TRANSMISSION SYSTEM
Filed March 10, 1944   4 Sheets-Sheet 3

Inventor:
Claude M. Summers,
by Harry E. Dunham
His Attorney.

June 25, 1946.  C. M. SUMMERS  2,402,928
SYNCHRONOUS MOTION TRANSMISSION SYSTEM
Filed March 10, 1944  4 Sheets-Sheet 4
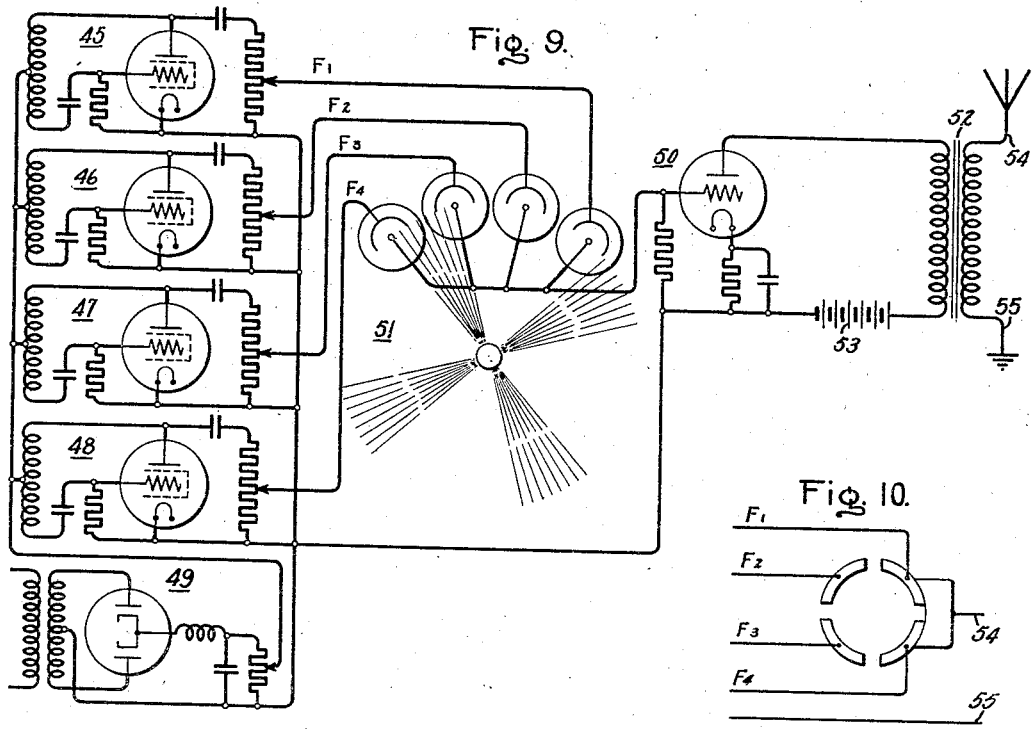
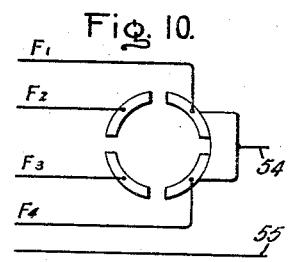
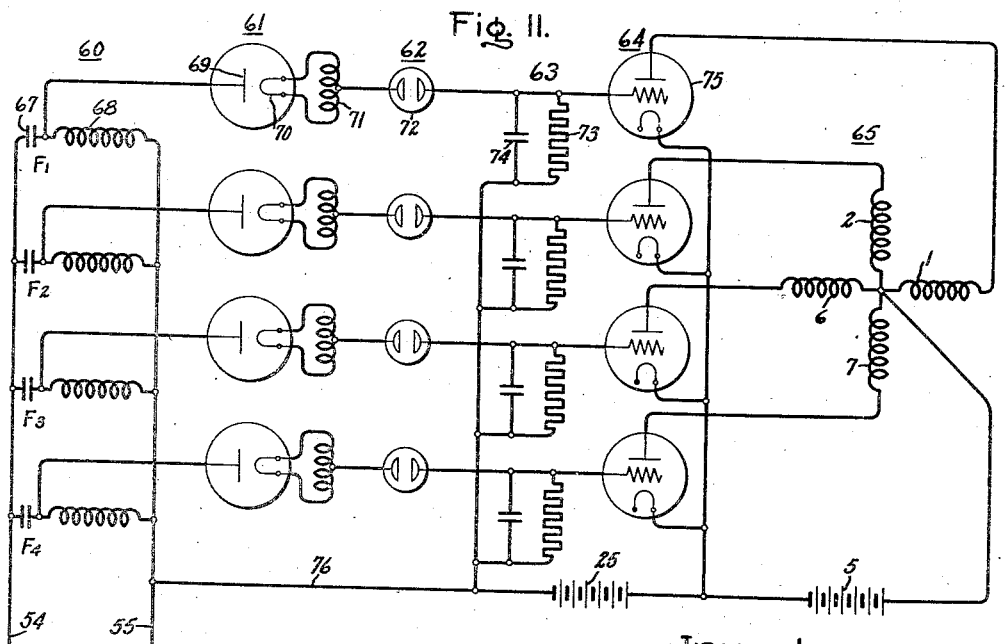
Inventor:
Claude M. Summers,
by Harry E. Dunham
His Attorney.

Patented June 25, 1946

2,402,928

UNITED STATES PATENT OFFICE 2,402,928

SYNCHRONOUS MOTION TRANSMISSION SYSTEM

Claude M. Summers, Fort Wayne, Ind., assignor to General Electric Company, a corporation of New York Application March 10, 1944, Serial No. 525,841

2 Claims. (Cl. 172—239)

My invention relates to synchronous motion transmission systems and apparatus of high accuracy and flexibility suitable for the transmission of continuous, intermittent, or reversible rotary motion of any speed over any distance by various established mediums of communication. One object of my invention is to provide a system and apparatus of the character described which does not take torque from the transmitter, notwithstanding that the receiver or receivers may be a high torque motor or motors. Another object of my invention is the provision of a system in which the transmitter and receiver are locked into synchronism, both when motion is being transmitted and when not. Another object of my invention is to provide for a change in speed ratio between the transmitter and receiver with respect to the motion being transmitted, if that is desirable. The manner in which these and other objects of my invention are obtained will be explained as the description proceeds. In carrying my invention into effect, I prefer to make use of a substantially standard form of two phase synchronous inductor motor as the synchronous receiver element and energize the same by direct current impulses which may be reversible. The features of my invention which are believed to be novel and patentable will be pointed out in the claims, appended hereto.

Figure 1:
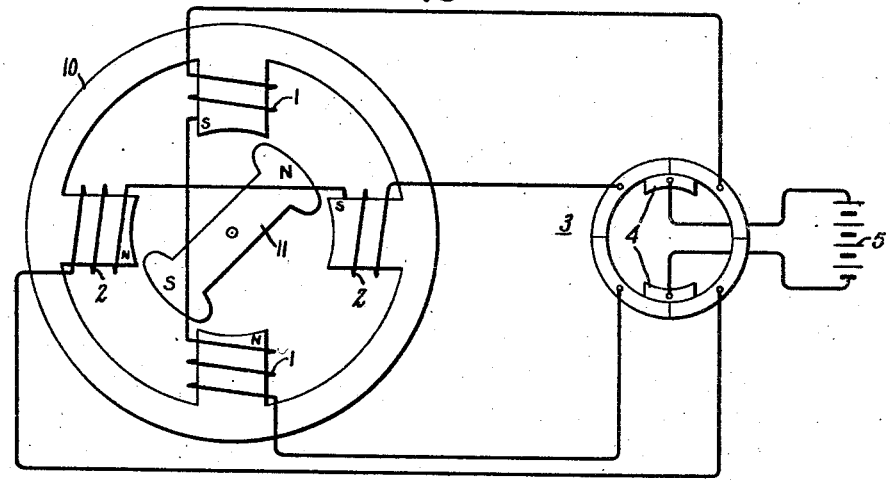
Figure 2:
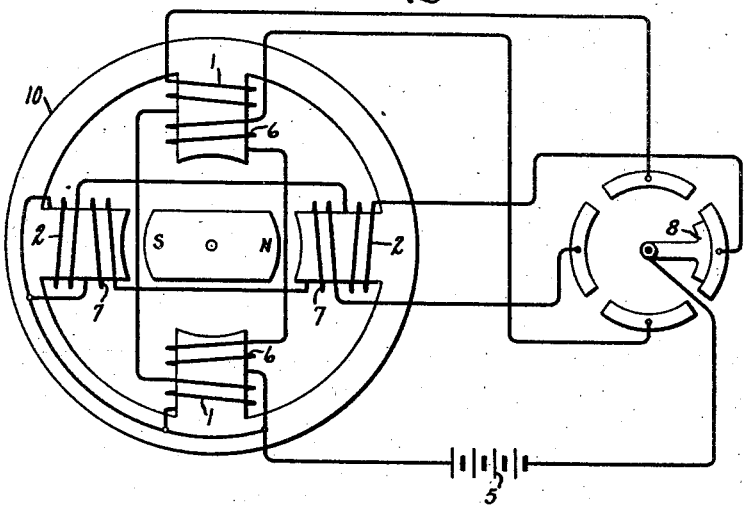
Figure 3:
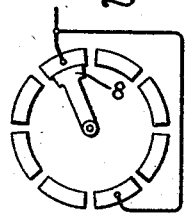
Figure 7:
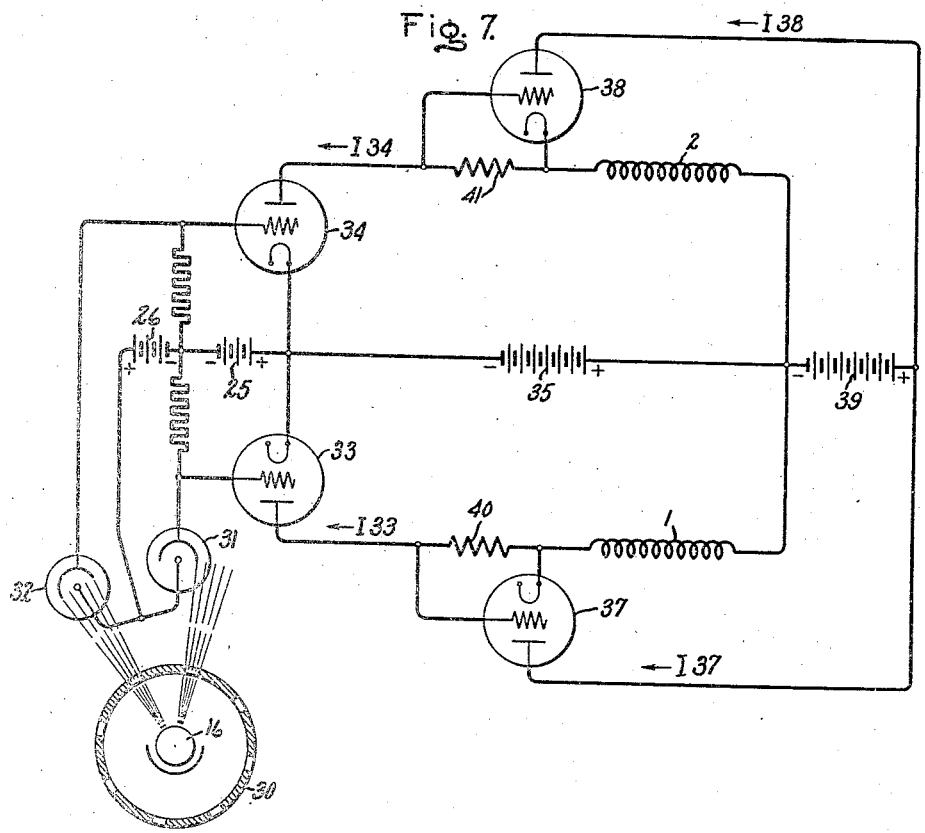
Figure 8:
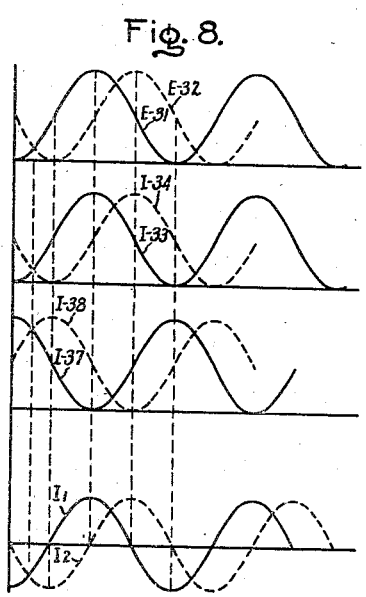
Figure 12:
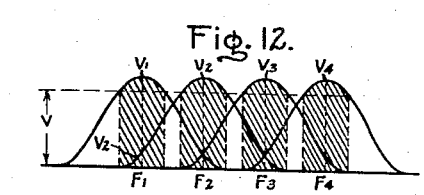

For a better understanding of my invention, reference is made in the following description to the accompanying drawings in which Figs. 1 and 2 show two simple forms of synchronous motion transmission systems which are included to illustrate basic principles of my invention. Fig. 3 is a transmitter of the type shown in Fig. 2 modified to double the rotary transmission ratio between transmitter and receiver as compared to Fig. 2. Fig. 4 is a preferred embodiment of my invention using the principle of Fig. 2. Fig. 5 is a plan view of a portion of the frictionless photoelectric transmitting commutator device of the type employed in Fig. 4. Fig. 6 represents output voltage curves of the transmitter of Fig. 4. Fig. 7 represents a preferred embodiment of my invention utilizing a principle explained in connection with Fig. 1. Fig. 8 shows current curves explanatory of Fig. 7. Fig. 9 represents a transmitter suitable for use when the transmitting channel employs carrier current or radio. Fig. 10 is a modified form of transmitter which can he used with Fig. 9 under certain conditions. Fig. 11 represents a form of receiver to be used with the carrier current or radio transmitter of Fig. 9, and Fig. 12 shows resonant frequency operating voltage curves explanatory of the receiving apparatus of Fig. 11.

Referring to Fig. 1, 10 represents the stator and 11 the permanent magnet rotor of a two phase, two pole synchronous inductor motor. The stator has two windings 1 and 2 each divided into two coils on opposite salient pole pieces. If windings 1 and 2 were connected in parallel to a single phase source of supply with a phase splitter such as a condenser in one winding circuit, the motor would run synchronously as a split phase motor. Instead of this the motor is shown connected through a transmitter commutator device 3 and its brushes 4 to a direct current source 5. The commutator has four segments and the motor connections thereto are such that the coils of winding 1 are connected across opposite pairs of segments, and the coils of the other winding 2 are connected across the other opposite pairs of segments. In the brush position shown both motor windings are energized in parallel, and, it may be assumed, produce polarities of the motor pole salients as represented by the designations N and S thereon, causing the polarized rotor 11 to take the position shown. If the brushes 4 be rotated 45 degrees clockwise, only winding 1 will be energized and the rotor 11 will rotate 45 degrees counterclockwise. Rotation of the brushes another 45 degrees clockwise will again energize winding 2 but in the opposite direction, thereby rotating rotor 11 another 45 degrees counter-clockwise, etc. This constitutes a simple form of a synchronous motion transmitting system reversible in direction and with a locking torque when stationary. The relative direction of rotation of transmitter and receiver motor may be reversed by interchanging the connections between motor windings and commutator segments. The motion may be fast, slow, or intermittent. The ratio of motion transmission may be changed. For example, doubling the number of commutator segments and connecting opposite segments in parallel will double the ratio of transmission. Likewise, doubling the motor pole number will halve the ratio of transmission.

Fig. 2 is essentially like Fig. 1 except that the motor has four windings, and a single brush commutator transmitter sends direct current impulses into the four windings in consecutive overlapping order and always in the same direction. Thus winding 1, Fig. 2, is similar to winding 1, Fig. 1, with coils on opposite poles of the motor. On the same poles is another winding 6 with its coils wound in the opposite direction. Similarly, a winding 7 having coils wound oppositely to the coils of winding 2 is on the other pair of opposite poles. One end of each winding is connected to the four commutator segments of the commutator 3, and the other ends are joined to a common connection to one side of the direct current supply source 5. The single brush 8 of the commutator is connected to the other side of source 5 and completes the connection. In the brush position shown, winding 2 is energized, producing the polarities of the motor pole pieces indicated by N and S and positioning the polarized rotor as shown. Rotation of brush 8 clockwise 45 degrees energizes winding 6, which will cause the motor rotor to rotate clockwise 45 degrees. Rotation of brush 8 another 45 degrees deenergizes winding 2 and the rotor 11 rotates clockwise another 45 degrees. Rotation of brush 8 another 45 degrees energizes winding 7, causing the rotor to turn another 45 degrees. When the brush 8 has rotated 180 degrees from the position shown, rotor 11 likewise will have rotated 180 degrees from the position shown, etc. This system has the same operation performance as the system of Fig. 1. Fig. 3 represents a transmitter commutator for the system of Fig. 2 which will double the motion transmission ratio. It is of course obvious that the motion of either transmitter or receiver motor of either system described may be stepped up or down by gearing. Having thus outlined certain basic principles, I will now proceed to describe various refinements constituting my invention and making for practicable systems.

In the first place I may use as the receiver motors, slow speed, two phase synchronous inductor motors of standard design, such as those described in United States Letters Patent No. 2,105,513 and No. 2,122,307 having many rotor poles or teeth, so that the amount of rotation per impulse change is of the order of a few degrees instead of 45 degrees. Also, I prefer to use a frictionless commutating device which gradually reduces and increases the current impulses so that they resemble sine waves whereby the motor rotor, instead of jumping from one position to another, has a smooth motion which can be made to follow substantially exactly the transmitter all through an impulse change. Such a commutating device is shown in Fig. 4 as used in connection with a four winding motor conforming in principle to Fig. 2.

In Figs. 4 and 5 I have shown a hollow drum 12 which is rotated or oscillated about its axis by a shaft 13 in response to the rotary motion to be transmitted. This may be the deflection of an instrument or high speed rotation. The drum is substantially closed except for, in this example, four equally spaced oval light apertures or windows 14 in its periphery and an opening in one end into which a stationary light socket and supporting bracket 15 extends to support a light 16 at the center of the drum opposite the windows 14. Arranged in an arc about the drum are four photocells 17, 18, 19, and 20. These cells are positioned so that a cone of light from lamp 16 will pass across all cells as the shutter drum 12 is rotated. Since there are four equally spaced windows 14 in the shutter drum, the cells should be spaced 22½ degrees apart. If only one window were used, the cells would be spaced 90 degrees apart. For two equally spaced windows the photocell spacing would be 45 degrees apart, of three windows 30 degrees apart, etc., so that for constant speed rotation of the drum the impulses sent out by the several cells will be equally time spaced. Variation of the number of windows changes the transmission ratio, and the device in question comprises a frictionless commutator device which takes the place of the commutating device of Fig. 2. However, instead of producing square wave impulses, the window openings 14 are so ovally shaped that the light which passes a given point varies approximately sinusoidally and the voltage impulses of the cells resemble sine waves. Furthermore, the size of the window openings relative to the distance away of the photocells is such that the impulses of two consecutive photocells have a time relation to each other as the time relation of the cycles in a two phase alternating current system. That is, when the sine wave impulses of tube 19 is a maximum, that of tube 18 is just ending and that of tube 20 just beginning, as pictured in Fig. 6, assuming clockwise rotation of the shutter drum of Fig. 4.

In Fig. 6 the waves which may represent the quantity of light falling on the cells and the resultant voltages produced by them are numbered with the same number as the cells to which they belong. Waves for 120 degrees rotation of the drum are represented. It is seen that the waves are the same as in a two phase, alternating current system if all of the negative half-waves of such a system be considered reversed, with the full line half-waves representing one phase and the dotted half-waves the other phase. Other equivalent frictionless commutator devices could be used in place of the one described to produce the same results. For example, the windows might be replaced by rotating light sources or by light reflecting mirrors rotated by the shaft.

In order to obtain ample power, the light cell impulses are amplified by four amplifiers 21, 22, 23, and 24 which may have as many stages as are necessary. The triodes shown are biased by the direct current source 25 through grid resistors so that no current passes through the plate circuit when no signal voltage is applied to the grids. The grids are respectively connected through the four photocells back to the cathodes through a direct current source 26 so that the tubes pass current in accordance with and in sequence of the photocell voltage impulses. The output circuits of the amplifiers are individually connected through the windings 1, 2, 6, and 7 of one or more synchronous inductor motors back to a common connection to a direct current source of supply 5. The windings 1, 2, 6, and 7 and the source 5 correspond to those similarly numbered in Fig. 2. Windings 1 and 6 correspond to one phase and are wound on the same poles but are reversed with respect to each other. Windings 2 and 7 correspond to the other phase, are wound on the same poles, and are reversed with respect to each other.

One of the motors supplied by the amplifier of Fig. 4 is shown in cross section and is similar to the motor described in United States Letters Patent No. 2,122,307, except that it has four windings 1, 2, 6, and 7 instead of two. Considering windings 1 and 6, these take the place of one phase winding of the patent and carry the currents corresponding to the two half-cycles of the same phase carried by the single winding of the patent which they replace. Similarly, windings 2 and 7 replace the single winding of the other phase of the motor of the patent. It may be pointed out that the motor may be operated from a commercial frequency two phase system by using windings 1 and 2 or windings 6 and 7. Coils 1 and 2 are wound to produce fluxes in one direction and coils 6 and 7 are wound to produce fluxes in the reverse direction in the motor. The amplifier used is designed to produce output current pulsations of the sine wave form shown in Fig. 6. It thus appears that a motor such as is shown in detail at the right in Fig. 4, when energized in accordance with my invention, has flux pulsations produced in it which are identical to those produced in the alternating current motor of the patent in so far as wave form and phase displacement are concerned, the movement of the commutator drum 12 one-fourth revolution corresponding to a complete cycle of alternating current in its effect upon the motor. There is, however, this important difference; that with my motor energizing arrangement the motor energizing current can be frozen, so to speak, at any desired phase position by simply stopping the commutator in such position. The currents with the particular phase relation existing at the instant of stopping the commutator continue to flow and magnetically lock the rotor of the motor in a corresponding rotary phase position. For the same reason the motor may be started, stopped, reversed, and run at any speed, following instantaneously and synchronously the movement of the frictionless commutator with great exactness since the sequence of the pulses feed to the motor reverses with reversals in the direction of rotation of the commutator. The ratio of transmission may be varied over a wide range, either by changing the pole number of the motor, or windows in the commutator, or both. The motor rotates the distance of one full tooth pitch for each one-fourth revolution of the commutator in the example given and if the motor has 24 teeth per rotor section, it will require six revolutions of the commutator to produce one revolution of the motor. If, however, the commutator has 20 windows and the motor 20 teeth or poles, the transmission ratio will be unity, etc. The motor or motors used may be tiny clock size motors or large power motors or both, it only being necessary to employ electronic control apparatus controlled by the frictionless transmitter and a power supply sufficient for the power requirements of the motor selected. Motors which are to be controlled in parallel should be wound or connected for substantially the same voltage.

The tube arrangement shown in Fig. 4 and in other figures may be modified considerably, and I do not wish to be limited to the particular vacuum tube arrangement shown. It is also possible to employ gas-filled tubes, in which case the power that may be supplied to the motor is unlimited. However, in such a case the wave shape of the current supplied to the motor would not be as satisfactory. Where gas-filled tubes are used, the power supplied from the motor may be an alternating current source. The frequency of such alternating current source should be sufficiently high to allow at least three or four and one-half cycles of alternating current power to occur during each pulse.

In Fig. 7 I have shown a modification of my invention the basic principle of which is similar to that of Fig. 1, and the motor of which may be identical to that of Patent No. 2,122,307 with only two windings 1 and 2 which here represent the motor windings of such patent. The drum 30 which is rotated in accordance with the motion to be transmitted is provided with eight equally spaced windows. Only two photocells 31 and 32 are employed and they are arranged with respect to the drum 30 and each other so that the light variation on each of them varies from a maximum to zero in a sinusoidal relation, but with a phase displacement of 90 degrees between periods of maximum light intensity. Thus, with uniform rotation of the drum in a clockwise direction, for example, each revolution corresponding to eight cycles, each tube has a light variation from maximum to zero eight times with maximum light intensity on tube 32 one-thirty second revolution or one-fourth cycle after maximum light intensity on tube 31. The light variation relation and resulting grid voltage bias produced by these cells are shown by curves $E_{31}$ and $E_{32}$ in Fig. 8 for clockwise rotation of the drum 30. The cells control the operation of tubes 33 and 34 accordingly. These tubes are biased to cutoff by a direct current source 25 and pass current when the bias is overcome when light strikes the cells and allows the voltage of a direct current source 26 to influence the tube grids. The tubes are supplied from a direct current source 35 and pass current pulses through the windings 1 and 2 of the motor which are connected in the plate circuits of tubes 33 and 34, respectively. The relative magnitude and phase relation of the sinusoidal currents passed by tubes 33 and 34 is represented in curves designated $I_{33}$ and $I_{34}$ in Fig. 8 where it is noted that these current pulses are in a time phase relation which may be considered to correspond to the positive half cycles of quarter phase alternating currents having a frequency proportional to the speed of rotation of the commutator device at any instant. Another set of triodes 37 and 38 supplied from a direct current source 39 are connected to supply current to motor windings 1 and 2, respectively, but in the reverse direction to the current flow produced in such windings by tubes 33 and 34. Tubes 37 and 38 are adjusted to pass maximum currents when no current is flowing through their grid resistors 40 and 41 in the plate circuits of tubes 33 and 34, but when currents flow in these resistors, the grid voltages of tubes 37 and 38 are changed accordingly and in directions to reduce their plate currents which are reduced to zero value when the resistors carry maximum current. Thus, as the output current of tube 34 rises and falls, that of tube 38 falls and rises and as the output current of tube 33 rises and falls, that of tube 37 falls and rises. The plate currents of tubes 37 and 38 are pictured in Fig. 8 in proper magnitude and time relation with the other voltages and currents there pictured and are designated by $I_{37}$ and $I_{38}$, respectively, and these current pulses have a time phase relation corresponding to the negative half cycles of the same quarter phase alternating currents previously assumed. The maximum values of the currents $I_{33}$, $I_{34}$, $I_{37}$, and $I_{38}$ are made equal in value and will depend somewhat on the load on the motor. Since currents $I_{33}$ and $I_7$ flow in motor winding 2 in opposite directions, the differential current flowing therein at any given instant is the difference of the instantaneous values of $I_{33}$ and $I_{37}$ which may be represented by $I_1$, Fig. 8. Likewise, $I_2$, equivalent to $I_{34}-I_{38}$ represents the differential current flowing in motor winding 2. It is thus seen that the current flow in the two phase motor windings is the equivalent of a normal two phase alternating current, and the motor will perform accordingly. Reversing the direction of rotation of the frictionless commutator device will reverse the phase relations of the several pairs of curves in Fig. 8, and the direction of rotation of the motor and the currents may be frozen, so as to speak, at their values at any desired instant by stopping the commutator which locks the motor in a corresponding rotary position. Thus, the results are similar to that of Fig. 4, but a smaller number of cells, leads, and motor windings are required.

In these modifications the power tubes will ordinarily be located near the motor, whereas the frictionless commutator may be located any desired distance from the motor, and the communicating channel may make use of telephone, telegraph, or power circuit wires, using an audio signal carrier current principle where that is necessary or desirable; and in Fig. 9 I have shown an audio transmitter, and in Fig. 11 an audio receiver suitable for this purpose.

Referring to Fig. 9, the audio frequency transmitter consists of four Hartley type oscillators 45, 46, 47, and 48 operating from a common source of D.-C. voltage supplied from a full wave rectifier 49. These oscillators are adjusted to produce different audio frequencies $F_1$, $F_2$, $F_3$, and $F_4$, respectively, and the output impulses of such frequencies are fed in overlapping synchronous relation to the input of an audio amplifier 50 by a four cell, four cycle per revolution frictionless commutator 51 of the character previously described. The different audio frequency amplified impulses as they occur are converted to alternating current impulses of corresponding frequency by a transformer 52 connected in the output circuit of the amplifier which is supplied from a direct current source 53. The output terminals of the transformer and of the transmitter are designated 54 and 55 and, as will be described, may be connected to a communication channel for carrier current transmission or to a radio antenna for radio transmission of the audio signals. The frequencies $F_1$, $F_2$, $F_3$, and $F_4$ to be selected will be those best suited for the type of communication channel to be employed. So far as the nature of the signal output is concerned, other than envelope wave shape, a mechanical commutator may be substituted for the frictionless commutator, amplifier, and transformer of Fig. 9 as represented in Fig. 10. The output terminals 54 and 55 of Fig. 9 or 10 may be connected directly to the input terminals of like number of Fig. 11 or, as mentioned above, carrier current or radio communication channels may be utilized.

In Fig. 11 there is represented an audio receiver consisting of five groups of apparatus designated 60 to 65, inclusive. In general, each group includes four similar devices, one device for each signaling frequency employed. Group 60 consists of four frequency selective circuits connected in parallel across the input terminals 54 and 55 and are differently tuned to respond to the frequencies $F_1$, $F_2$, $F_3$, and $F_4$. These frequency designations are marked opposite the frequency selective circuits which are tuned to respond thereto. These circuits 60 may each consist of simple tuned resonant circuits comprising a capacitor 67 and an inductance 68 in series as represented. Group 61 of Fig. 11 consists of four rectifiers, preferably of the low resistance, mercury filled vacuum tube type, which rectifiers are connected in individual circuits with the four selectively tuned receiver circuits to produce rectification of the signaling frequencies $F_1$ to $F_4$, inclusive, as and when they occur. Since these rectifiers are in separate circuits, their filament supplies must be insulated from ground and from each other and, consequently, four transformer secondaries are used to supply the filaments of these rectifiers. The anodes 69 are connected between the condenser and reactance of the corresponding tuned circuit. The filaments 70 are connected across transformer secondary windings 71 and from a midpoint of such windings through glow lamp cutoffs 72 constituting the group 62 devices, parallel connected resistance 73 and condenser 74 units in group 63, back to the other side of the reactances 68 through a connection 76 common to the four circuits. The glow lamps 72 of group 63 are for the purpose of increasing the sharpness of the cutoff of each frequency. The glow lamps will not pass current unless the voltage thereacross is sufficiently high to break down the gas column and, hence, these lamps will only respond to voltages in excess of a selected value. Group 63 comprises the resistances 73 and capacitors 74 in parallel for biasing the grids of the amplifier tubes 75 of group 64. These parallel resistance capacitance elements provide filtering action for the rectified impulses which pass through them. The grids of the tubes 75 are normally biased to cutoff by a direct current source 25 but pass current when such bias is overcome by rectified current flow in the grid bias circuit. Group 65 comprises the synchronous inductor receiver motor or motors and supply source 5. The motor windings 1, 2, 6, and 7 are in the plate circuits of the four tubes, and this part of the apparatus is similar to that described in connection with Fig. 4 and the parts are similarly numbered.

Fig. 12 is helpful in explaining the operation of the audio frequency receiver. This Fig. 12 does not represent the four overlapping currents which are supplied to the motor, but rather, the four loops represent the resonant voltages which would exist across the four inductances 68 of group 60, plotted as ordinates, if all frequencies within the range $F_1$, $F_2$, $F_3$, and $F_4$, plotted as abscissas, were received, and the relation of these voltages to the breakdown voltages of the glow tubes. When frequency $F_1$ only is being transmitted and received, a maximum voltage $V_1$ will exist across the $F_1$ inductance 68. However, due to the fact that the tuning of the frequency responsive receivers is not sharp, some voltage $V_2$ will also exist across the $F_2$ inductance but at this time, I wish to have the $F_1$ circuit glow tube 70 conducting but not the glow tubes for the other frequency circuits. V represents the breakdown voltage of the glow tubes and it is seen that at frequency $F_1$ the voltage across the glow tube of the $F_2$ circuit is very much lower namely $V_2$, so that the glow tube in the $F_2$ circuit does not break down. Likewise, the glow tubes in the $F_3$ and $F_4$ circuits are zero, and these circuits do not carry current. Now, when both frequencies $F_1$ and $F_2$ are being received, the corresponding glow tubes 70 in both the $F_1$ and $F_2$ circuits conduct current, etc. If the different frequencies used were as far apart as $F_1$ and $F_4$ are represented to be in Fig. 12, I would not need to have the glow tubes in the circuits because the $F_1$ frequency produces no voltage across the inductance in the $F_4$ circuit. Thus, Fig. 12 shows that by employing the glow tubes, I may use frequencies and tuned circuits with which there is some overlapping of the resonant frequency curves without difficulty. The currents fed to the motor windings 1, 2, 6, and 7 will overlap just as explained in connection with Fig. 6, but such overlapping should not be confused with the overlapping resonant curves of Fig. 12.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A synchronous motion transmitting system comprising a two-phase synchronous motor having $\phi_1$ and $\phi_2$ windings, $+\phi_1$ and $-\phi_1$ direct current energizing circuits for the $\phi_1$ winding and $+\phi_2$ and $-\phi_2$ direct current energizing circuits for the $\phi_2$ winding, an electron tube in each of said circuits, a rotary commutator device for controlling the tubes in the $+\phi_1$ and $+\phi_2$ circuits such that when said device is continuously rotated at a uniform speed in a given direction the tubes in $+\phi_1$ and $+\phi_2$ circuits pass current pulses in a time phase relation corresponding to the positive half-cycles of quarter-phase alternating currents having a frequency proportional to the speed of rotation of said device, and control means for the tubes in the $-\phi_1$ and $-\phi_2$ circuits responsive to the currents in the $+\phi_1$ and $+\phi_2$ circuits for causing the latter tubes to pass current pulses in a time phase relation corresponding to the negative half-cycles of such quarter-phase currents.

2. A synchronous motion transmitting system comprising a two-phase alternating current motor, two sources of direct current supplied therefor, a circuit between each source and each phase of said motor, said circuits each containing an electronic tube, a pair of light cells, rotary means for cyclically sweeping light beams across said cells to render them conducting and non-conducting, connections for controlling two of the electronic tubes from said light cells such that when the rotary device is rotating at uniform speed, current pulsations are passed through the motor windings in one direction from one source in a time phase relation corresponding to the positive half cycles of quarter phase alternating currents having a frequency proportional to the speed of rotation of said rotary device, connections whereby said current pulsations control the other two tubes causing current pulsations to be passed through the motor windings in the other direction from the other source, the latter pulsations having maximum value with minimum value of their controlling pulsations.

CLAUDE M. SUMMERS.